(12) United States Patent
Banin et al.

(10) Patent No.: US 11,088,891 B1
(45) Date of Patent: Aug. 10, 2021

(54) METHODS AND DEVICES GENERATING A CALIBRATION SIGNAL FOR AN IQ IMBALANCE

(71) Applicant: Intel Corporation, Santa Clara, CA (US)

(72) Inventors: Elan Banin, Raanana (IL); Ran Shimon, Giv'Atayim (IL); Shahar Gross, Nes-Tziona (IL); Nurit Spingarn, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/830,332

(22) Filed: Mar. 26, 2020

(51) Int. Cl.
*H04L 27/36* (2006.01)
*H04L 27/38* (2006.01)

(52) U.S. Cl.
CPC ........ *H04L 27/364* (2013.01); *H04L 27/3818* (2013.01)

(58) Field of Classification Search
CPC .......................... H04L 27/364; H04L 27/3818
USPC ................................................ 375/260, 261
See application file for complete search history.

(56) References Cited

U.S. PATENT DOCUMENTS

| 8,010,064 | B2 | 8/2011 | Kim et al. |
| 2007/0025433 | A1 | 2/2007 | Hammerschmidt et al. |
| 2014/0204986 | A1 | 7/2014 | Suissa et al. |
| 2016/0100455 | A1* | 4/2016 | Montalvo ............ H04B 1/1036 375/345 |
| 2020/0382170 | A1* | 12/2020 | Lang .................... G01S 7/4008 |

OTHER PUBLICATIONS

European Search Report issued for the EP Patent Application No. 20204944, dated Mar. 30, 2021, 7 pages (for informational purposes only).

* cited by examiner

*Primary Examiner* — Fitwi Y Hailegiorgis
(74) *Attorney, Agent, or Firm* — Viering, Jentschura & Partner mbB

(57) ABSTRACT

A communication circuitry device for correcting a phase imbalance, the communication circuitry device comprising one or more processors configured to estimate a non-linear component of a reference signal based on a measurement of a tone at a first harmonic of a plurality of harmonics of the reference signal, estimate an in-phase component of the reference signal based on subtracting the non-linear component from a measurement of a tone at a second harmonic of the plurality of harmonics of the reference signal, and generate a calibration signal based on the estimation of the in-phase component.

20 Claims, 6 Drawing Sheets

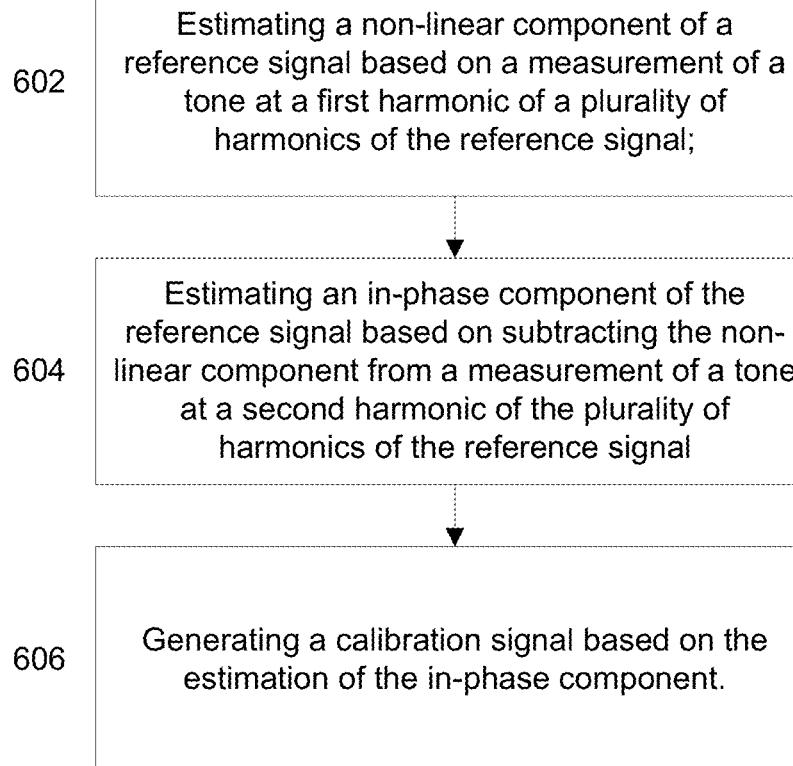

METHODS AND DEVICES GENERATING A CALIBRATION SIGNAL FOR AN IQ IMBALANCE

TECHNICAL FIELD

Various embodiments relate generally to methods and devices for generating a calibration signal for a quadrature amplitude modulation imbalance.

BACKGROUND

Calibration of an in-phase/quadrature (IQ) imbalance may be done with the use of a loop-back (LPBK). An IQ imbalance occurs by a timing mismatch in a mixer between the in-phase and quadrature components of a signal generated according to quadrature amplitude modulation. In a system of in-phase/quadrature transmission and reception, the main challenge to calibrating a signal is separating the transmission and reception impairments. In a system of polar transmission and reception, an IQ imbalance does not occur. Systems with polar transmission and in-phase/quadrature reception do not require separating the transmission and reception impairments because only the reception may have an IQ imbalance. However, there is a challenge that polar transmission suffers from phase non-linearity impairments. Both impairments, IQ imbalance and phase non-linearity, represent an error as a function of phase. Therefore, existing IQ calibration algorithms do not function in the presence of a transmission phase non-linearity error.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 shows an exemplary flow chart for generating a calibration signal according to some aspects.

DESCRIPTION

Figure 1:
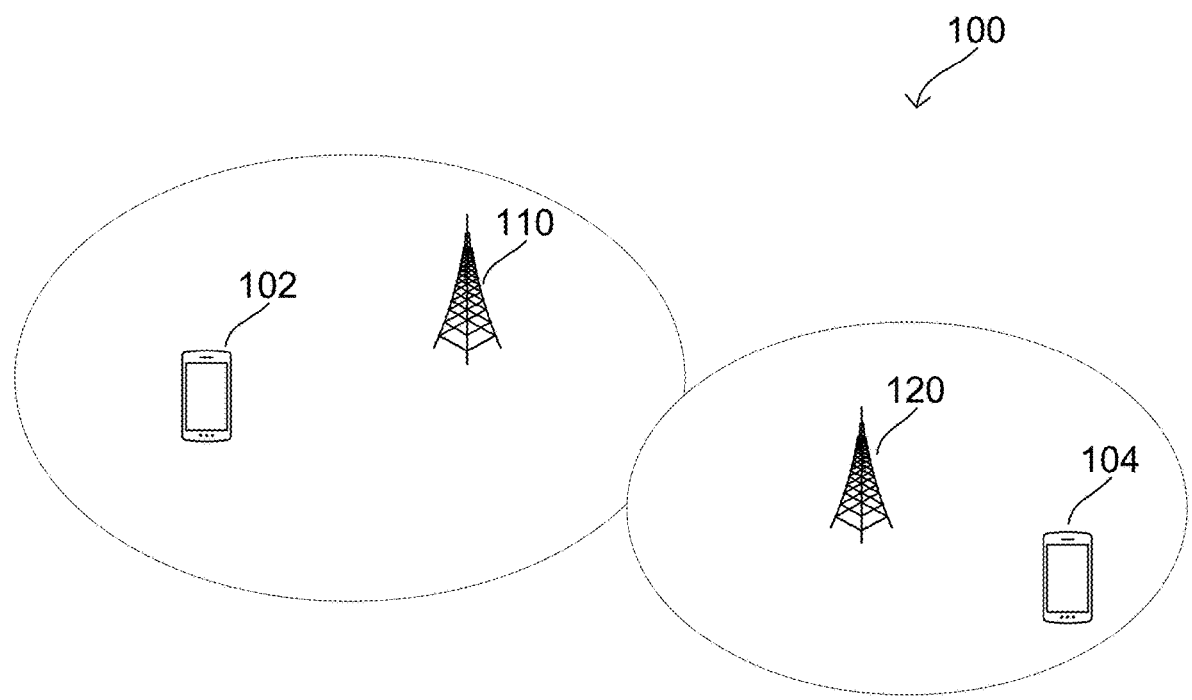
FIG. 1 shows an exemplary radio communication network according to some aspects.

The following detailed description refers to the accompanying drawings that show, by way of illustration, specific details and aspects of embodiments in which the disclosure may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "reduced subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the wireless transmission of radio signals) and logical transmission (e.g., the transmission of digital data over a logical software-level connection). For example, a processor (or controller or physical layer) may transmit or receive data over a software-level connection with another processor (or controller or physical layer) in the form of radio signals, where the physical transmission and reception is handled by radio-layer components such as RF transceivers and antennas, and the logical transmission and reception over the software-level connection is performed by the processors.

Many wireless communication technologies use beamforming to increase link strength between transmitter and receiver. The Third Generation Partnership Project's (3GPP) Fifth Generation (5G) New Radio (NR) standard, for example, includes mechanisms for beamforming in both the transmit and receive directions. Focusing on the terminal side, a terminal device (e.g., a UE) may identify a receive antenna beam and a transmit antenna beam for a given network access node (e.g., gNodeB). In the receive direction, the terminal device can then increase link strength by receiving signals from the network access node with the receive antenna beam. Similarly, in the transmit direction the terminal device can boost link strength by transmitting signals to the network access node with the transmit antenna beam.

Some terminal device manufacturers initially assumed that terminals could select transmit antenna beams (e.g., for mmWave bands) using beam correspondence. That is, once a terminal device performed beamsweeping to identify a receive antenna beam, it could then use a transmit antenna beam that overlaps spatially with the receive antenna beam—in other words, a transmit antenna beam that corresponded with the receive antenna beam. Assuming uplink and downlink channel reciprocity, the terminal device would not need to perform a dedicated transmit beamsweeping procedure to determine the transmit antenna beam; it could instead directly derive the transmit antenna beam from the receive antenna beam that it already acquired. Because transmit beamsweeping requires extra radio resources (both for beamsweeping and for the network access node to send feedback), beam correspondence can avoid extra radio resource allocation in the network side.

However, despite its benefits, beam correspondence may have drawbacks in practice. In real-world use cases, a terminal device's transmit and receive circuitry will not be ideal. This means a transmit antenna beam may operate differently from a receive antenna beam, even if they are steered in the same direction. For instance, a terminal device's transmit phase shifters may be implemented differently from its receive phase shifters, or its internal design may have other imperfections that lead to differences between the transmit and receive paths. As a result, it can be both challenging and expensive for vendors to design an ideal terminal device that can support full beam correspondence, especially in high frequency bands like 5G mmWave.

Accordingly, when real-world terminal devices operate, their transmit antenna beams may not overlap perfectly with the best receive antenna beam obtained from beamsweeping, even if the transmit and receive antenna beams are theoretically identical. Moreover, when the terminal device transmits with the transmit antenna beam, the equivalent isotropically radiated power (EIRP) may not be optimally focused in the desired direction, leading to sub-optimal uplink performance.

Though 3GPP discussions to date have tried to address these potential issues, the proposed solutions are still not ideal. For instance, 3GPP discussions have proposed that a terminal device can choose to support either full beam correspondence or partial beam correspondence. When operating, a terminal device can indicate its capability to the network. If the terminal device supports full beam correspondence, it is assumed that it can reuse the same receive antenna beam in the transmit direction. As discussed above, it can be very complex and expensive to manufacture devices that meet this criteria.

On the other hand, terminal devices that only support partial beam correspondence may use transmit beamsweeping to meet the beam correspondence accuracy requirements. While these devices may be less complex and expensive, they may use extra network resources and consume additional power. Specifically, the network will schedule specific reference signal resources for the terminal device (e.g., beam management (BM) sounding reference signal (SRS) resources for 5G NR). The terminal device transmits these reference signal resources as scheduled, using different transmitting antenna beams for different reference signal resources. The serving network access node then measures the reference signal resources and reports back to the terminal device which reference signal resources. Based on that feedback, the terminal device can identify which transmit antenna beam produced the strongest radio link and then select that transmit antenna beam for transmitting to the network access node.

Though effective, transmit beamsweeping requires extra radio resources for the reference signals and increases device power consumption. Moreover, like in 3GPP NR, the terminal device may not be able to dynamically trigger transmit beamsweeping. That is, the network may have complete discretion in triggering transmit beamsweeping for the terminal device, and may only allocate reference signal resources (e.g., BM SRS for NR) to the terminal device periodically. As a result, even if the terminal device knows that it should update its transmit antenna beam, it may not be able to trigger transmit beamsweeping on its own. For instance, the terminal device may update its receive antenna beam with receive beamsweeping, which likely means that it should also update its transmit antenna beam. However, since the network will not know when the terminal device's receive antenna beam changes, the network may not immediately trigger transmit beamsweeping. The terminal device may thus not be able to refine its transmit antenna beam using beamsweeping and may be stuck with poor transmit beamforming performance until the network access node eventually triggers transmit beamsweeping.

Recognizing these drawbacks, this disclosure is directed to a beamsweeping technique that uses payload data and receiver feedback to select a transmit antenna beam for a transmitter. For example, a terminal device may transmit to a network access node multiple blocks of payload data using different transmit antenna beams. The network access node may receive the payload data and respond with payload data feedback, such as retransmission information and transmit power adjustment requests. The terminal device can then assess the different transmit antenna beams based on the payload data feedback, such as by evaluating which transmit antenna beams had low retransmission rates or which had few transmit power increase requests. Using this information, the terminal device can then select one of the transmit antenna beams and use that transmit antenna beam to transmit to the network access.

Since the terminal device tests transmit antenna beams on payload data, the terminal device may not need dedicated radio resources for reference signals. This conserves radio resources and enables the terminal device to update its transmit beam without waiting for the network to allocate dedicated radio resources. Similarly, because the terminal device uses existing control resources for the feedback (e.g., ACKs/NACKs and transmit power control (TPC)), the network access node may not need to allocate extra resources to transmit separate beamsweeping feedback. Moreover, the terminal device can avoid the power penalty of performing a standalone transmit beamsweeping procedure.

Figure 2:
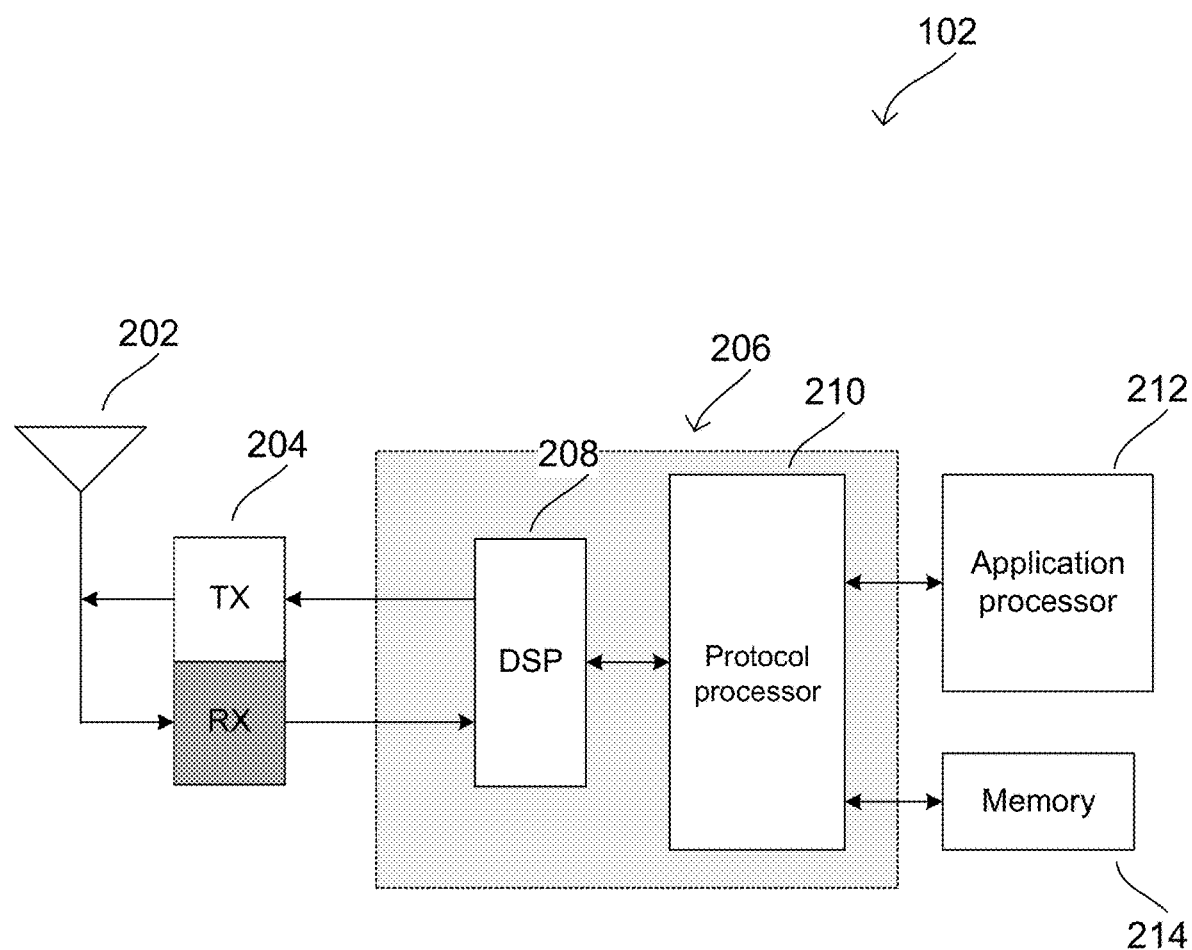
FIG. 2 shows an exemplary internal configuration of a terminal device according to some aspects.

This disclosure will first discuss general configurations for a network, terminal device, and beamforming, and will follow that with a description of beamsweeping techniques that use payload data. FIGS. 1 and 2 depict a general network and device architecture for wireless communications. FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, WiGig, etc.), these examples are illustrative and may be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, 5G NR, and the like, any of which may be applicable to radio communication network 100.

FIG. 2 shows an exemplary internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory circuitry or storage element of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 112. If the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

The present disclosure provides various aspects for devices to generating a calibration signal in a system of polar transmission and in-phase/quadrature reception. In a heterogeneous environment with polar transmission and in-phase/quadrature reception, a calibration signal for an IQ imbalance may have to be generated and used to calibrate a in-phase/quadrature reception in the presence of a phase non-linearity impairment of a polar transmission. Given these limitations, the devices and methods of this disclosure may utilize a loopback to efficiently estimate and generate a calibration signal.

Using a loop back a polar transmission may be used to generate a calibration signal for an IQ imbalance in in-phase/quadrature reception. In one example, a system may transmit a single tone or carrier wave (CW) according to polar modulation. The tone is measured across several harmonics of the tone, including in the negative frequency or image. By measuring the tone in the negative frequency, it is possible to separate the phase non-linearity impairment from the IQ imbalance on the tone in the negative frequency. This may be accomplished by taking into account phase non-linearity behavior for a signal transmitted according to polar modulation.

The device may connect a transmission according to polar modulation via a loopback to a reception according to quadrature amplitude modulation. To estimate the IQ imbalance, the device may transmit a test signal.

The device may use a carrier wave (CW) signal for estimating the IQ imbalance. An advantage of using a CW may be seen in the frequency domain of the CW. The IQ imbalance is concentrated to a single tone in a negative frequency. The device may measure the tone in a negative frequency where most of the noise portion of the measured tone may be separated from the measurement. This avoids other frequency dependent impairments. For example, impairments occurring in the $3^{rd}$ and $5^{th}$ harmonics.

The device transmits a CW as the test signal with phase non-linearity (INL) according to polar modulation. Choosing to transmit the test signal with INL generates spurs at different harmonics of the signal. The IQ imbalance may be estimated using the measured tone at a negative frequency minus the INL spur measured at a positive frequency.

The device measures the tone in the negative frequency and subtracts to the INL spur measured at a positive frequency. For example, the device may measure a tone at the $3^{rd}$ harmonic to estimate the INL spur. Additionally, the device may measure a tone at the $-1^{st}$ harmonic. The measurement at the $-1^{st}$ harmonic is the sum of the IQ image and the INL spur at the given frequency of the $-1^{st}$ harmonic. The device may subtract the INL spur from the measure tone at the $-1^{st}$ harmonic to determine the IQ image. The IQ image is then used to estimate an IQ imbalance and generate a calibration signal.

To separate the INL spur from the image measured tone at the $-1^{st}$ harmonic, the device may measure two other tones at two other harmonics. For example, measuring the tone at the $1^{st}$ harmonic (fundamental frequency) and the $3^{rd}$ harmonic.

The measurements may be a calculation of the Discrete Fourier Transform (DFT) at all three harmonics. For example, the DFT of tones at the $1^{st}$, $-1^{st}$, and $3^{rd}$ harmonics may be represented as $f_{cw}$, $-f_{cw}$, and $3f_{cw}$ respectively.

The estimate of the INL component at the $-1^{st}$ harmonic may be calculated according to the following equation (1):

$$\widehat{INL}_{-f_{cw}} = -DFT_{3f_{cw}} \cdot e^{j2 \angle DFT_{f_{cw}}}$$

The estimate of the IQ image component at the $-1^{st}$ harmonic may be calculated according to the following equation (2):

$$\hat{\beta} = DFT_{-f_{cw}} - \widehat{INL}_{-f_{cw}}$$

Figure 3:
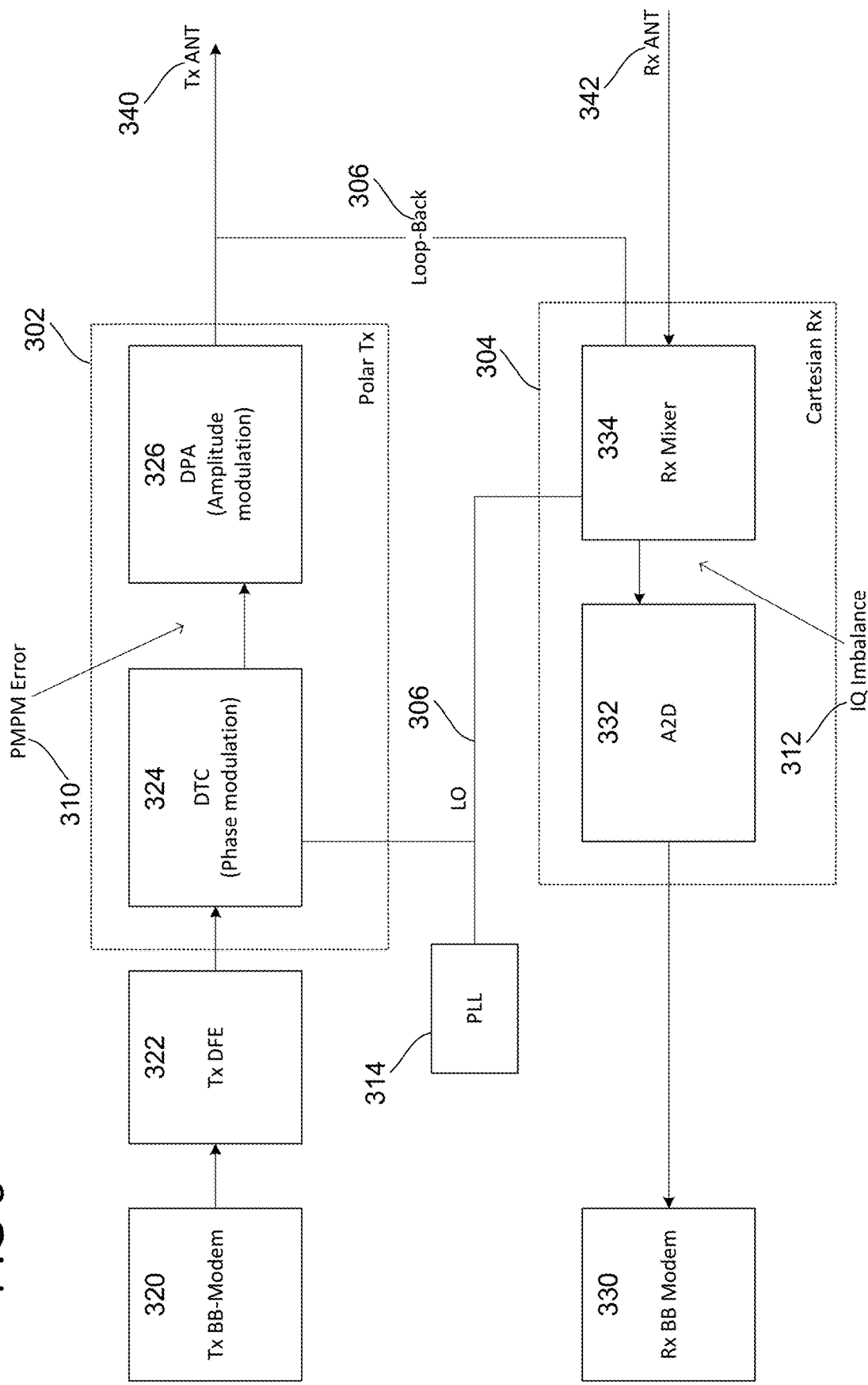
FIG. 3 shows an exemplary system for transmitting a signal according to polar modulation and receiving a signal according to quadrature amplitude modulation according to some aspects.

FIG. 3 shows an exemplary architecture of a system 300 for generating an IQ calibration signal according to some aspects. System 300 may be configured to generate an IQ calibration signal as described in this disclosure. In the configuration shown in FIG. 3, system 300 may include polar phase transmitter 302 and in-phase/quadrature phase receiver 304 connected via loopback 306. Loopback 306 may include phase locked loop 314. A test signal may be transmitted via transmitter 302 through loopback 306 to in-phase/quadrature receiver 304 and feedback to the transmitter 302. Transmitter 302 may include Digital to Clock (DTC) 324 and Digital Power Amplifier (DPA) 326. A phase non-linearity impairment 310 may be introduced between DTC 324 and DPA 326. Transmitter 302 may transmit a polar signal to antenna 340. Receiver 304 may include Mixer 334 and Analog to Digital (A2D) converter 332. Receiver 304 may receive a signal via antenna 342. Within receiver 304, mixer 334 may introduce an IQ imbalance 312 between receiving a signal from antenna 342 and sending the signal to A2D converter 332.

A polar signal may originate with a transmission baseband modem 320. Modem 320 may be connected to Decision Feedback Equalizers (DFE) 322. The signal originating with modem 320 may pass through DFE 322 before being sent to transmitter 302.

The signal received from antenna 342 may be sent to in-phase/quadrature receiver 304 before being sent to a baseband modem 330.

Figure 4:
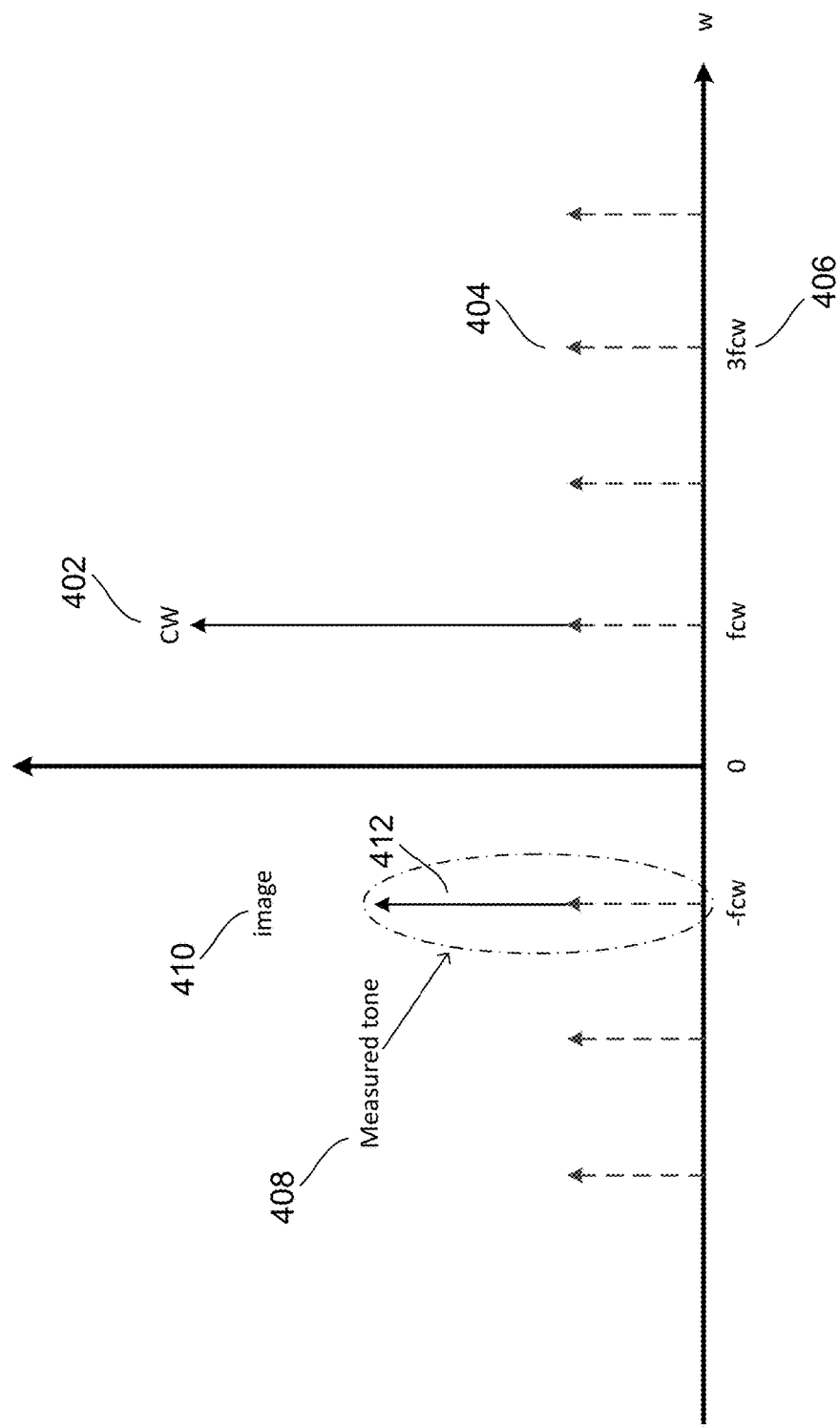
FIG. 4 shows an exemplary measurement of tones at different harmonics of a signal.

FIG. 4 shows an exemplary spectrum 400 of frequencies of a test signal 402 across several harmonics, including an image in negative frequencies according to some aspects. Test signal 402 is transmitted at the $1^{st}$ harmonic, for example according to architecture of FIG. 3. Because test signal 402 is transmitted with phase non-linearity, phase non-linearity errors 404 are transmitted at harmonics of the test signal 402. The tone 404 at the $3^{rd}$ harmonic 406 is measured and used to estimate the INL component. A tone 408 at the $-1^{st}$ harmonic is measured in the image 410. The phase non-linearity effect on the measured image tone 408 is estimated by measuring tones at other harmonics, for example at the $3^{rd}$ harmonic 406. The measured tone 404 at the $3^{rd}$ harmonic 406 may be subtracted from image tone 408 to estimate the IQ imbalance component 412.

The estimation of the phase non-linearity effect on the measured image tone 408 may be shown by the following equation (3):

$$DFT_{-f_{cw}} \approx e^{j2 \angle DFT_{f_{cw}}} \cdot DFT_{3f_{cw}}$$

Equation (3) can be proven by the following sequence of equations.

A general carrier wave signal without phase non-linearity and IQ imbalance may be represented by the following equation (4):

$$X[n] = e^{j(\omega_c n + \varphi_0)}$$

Where:

$\varphi_0$ is the (unknown) initial phase;

$$\omega_c \triangleq 2\pi \frac{f_{cw}}{F_s};$$

and $F_s$ is the sampling rate.

A carrier wave generated according to polar modulation with phase non-linearity may be represented by the following equation (5):

$$X_{INL}[n] = e^{j(\omega_c n + \varphi_0)} \cdot e^{j\varepsilon(\omega_c n)}$$

A Discrete Fourier Transform of a carrier wave generated according to polar modulation with phase non-linearity may be represented by the following equation (6):

$$DFT[\omega] = \sum_{n=0}^{N-1} e^{j(\omega_c n + \varphi_0)} \cdot e^{j\varepsilon(\omega_c n)} \cdot e^{-j\omega n}$$

A Discrete Fourier Transform (DFT) of a tone at the $-1^{st}$ harmonic of the carrier wave of equation (5) may be represented by the following equation (7):

$$DFT_{-f_{cw}} \triangleq DFT[\omega = -\omega_c] = \sum_{n=0}^{N-1} e^{j(\omega_c n + \varphi_0)} \cdot e^{j\varepsilon(\omega_c n)} \cdot e^{j\omega_c n}$$

Where equation (7) may be reduced to:

$$DFT_{-f_{cw}} = e^{j\varphi_0} \cdot \sum_{n=0}^{N-1} e^{j2\omega_c n} \cdot e^{j\varepsilon(\omega_c n)}$$

Assuming that the INL is small enough, for example $|\varepsilon[\cdot]| \ll 1$, calculations can be made with the following approximation:

$$e^{j\varepsilon(\omega_c n)} \approx 1 + j\varepsilon(\omega_c n)$$

Based on the approximation, equation (7) may further be reduced to:

$$DFT_{-f_{cw}} \approx e^{j\varphi_0} \cdot \sum_{n=0}^{N-1} e^{j2\omega_c n} \cdot (1 + j\varepsilon(\omega_c n))$$

Assuming the DFT is done on an integer number of cycles; for example $$\left(N = K\frac{Fs}{f_{cw}}; K \in Z\right),$$

then the following summation:

$$\sum_{n=0}^{N-1} e^{j2\omega_c n} = 0$$

Ultimately, equation (7) may be reduced to:

$$DFT_{-f_{cw}} \approx e^{j\varphi_0} \cdot \sum_{n=0}^{N-1} e^{j2\omega_c n} \cdot j\varepsilon(\omega_c n)$$

Similarly, a DFT of a tone at the 3rd harmonic of the carrier wave of equation (5) may be represented by the following equation (8):

$$DFT_{3f_{cw}} \approx e^{j\varphi_0} \cdot \sum_{n=0}^{N-1} e^{-j2\omega_c n} \cdot j\varepsilon(\omega_c n)$$

The DFT of the tone at the 3rd harmonic $DFT_{3f_{cw}}$ may be used to estimate $DFT_{-f_{cw}}$. In the spectrum, the $DFT_{-f_{cw}}$ is masked by the IQ-image, while the $DFT_{3f_{cw}}$ is "clean." DFT of the tone at the $3^{rd}$ harmonic may be reduced as shown below in equation (9):

$$DFT_{3f_{cw}} \approx e^{-j\varphi_0} \cdot \sum_{n=0}^{N-1} e^{j2\omega_c n} \cdot (-j\varepsilon(\omega_c n)) =$$

$$e^{-2j\varphi_0} \cdot \left(-e^{j\varphi_0}\sum_{n=0}^{N-1} e^{j2\omega_c n} \cdot j\varepsilon(\omega_c n)\right)$$

The right most term may be substituted with $DFT_{-f_{cw}}$ to reduce equation (9) to:

$$DFT_{3f_{cw}} \approx -e^{-2j\varphi_0} \cdot DFT_{-f_{cw}}$$

When solving for $DFT_{-f_{cw}}$, equation (9) may be rewritten as:

$$DFT_{-f_{cw}} \approx -e^{2j\varphi_0} \cdot DFT_{3f_{cw}}$$

The initial phase $e^{j\varphi_0}$ can be estimated by from $DFT_{f_{cw}}$ using equation (10):

$$DFT_{f_{cw}} \approx e^{j\varphi_0} \cdot \sum_{n=0}^{N-1} e^{j0n} \cdot (1 + j\varepsilon(\omega_c n)) = e^{j\varphi_0} \cdot \left(N + j\sum_{n=0}^{N-1} \varepsilon(\omega_c n)\right)$$

The DC value of the INL component is defined to be zero. Otherwise it would be a constant offset in time and would be regarded as part of the initial random phase. Replacing the INL term, $j\Sigma_{n=0}^{N-1}\varepsilon(\omega_c n)$, with zero, we can rewrite equation (10) as:

$$DFT_{f_{cw}} = N \cdot e^{j\varphi_0}$$

Solving for the initial phase, equation (10) may be rewritten as:

$$e^{j2\varphi_0} = e^{j2 \cdot \angle DFT_{f_{cw}}}$$

Replacing the initial phase as determined in equation (10) into equation (9) we can prove equation (3):

$$DFT_{-f_{cw}} 26 - e^{j2 \cdot \angle DFT_{3f_{cw}}}$$

Figure 5:
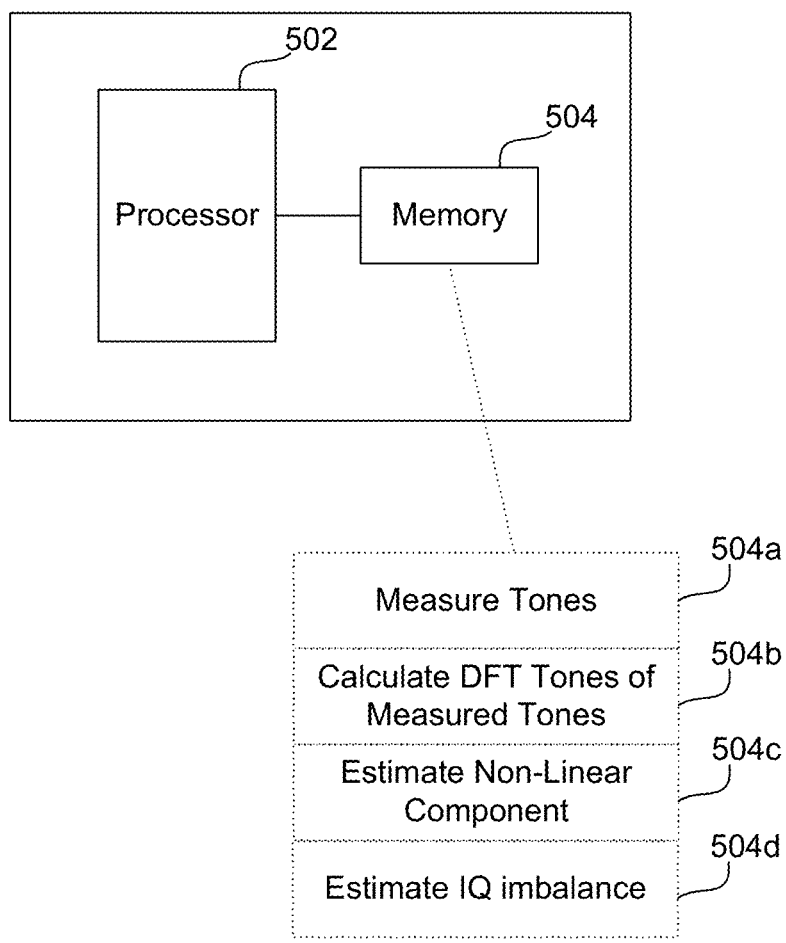
FIG. 5 shows an exemplary internal configuration of a device according to some aspects.

FIG. 5 shows an exemplary internal configuration of a device 500 according to some aspects. As shown in FIG. 5, device 500 may include processor 502 and memory 504. Processor 502 may be a single processor or multiple processors, and may be configured to retrieve and execute program code to perform the transmission and reception, channel resource allocation, and cluster management as described herein. Processor 502 may transmit and receive data over a software-level connection that is physically transmitted as wireless radio signals by radio frequency equipment. Memory 504 may be a non-transitory computer readable medium storing instructions for one or more of a tone measurement subroutine 504a, a DFT calculation subroutine 504b, a non-linear component estimation subroutine 504c, and/or an IQ imbalance estimation subroutine 504d.

Tone measurement subroutine 504a, a DFT calculation subroutine 504b, a non-linear component estimation subroutine 504c, and/or an IQ imbalance estimation subroutine 504d may each be an instruction set including executable instructions that, when retrieved and executed by processor 502, perform the functionality of the devices and the methods described herein, e.g., with respect to the method described in FIG. 6 and/or other parts of this disclosure. For example, tone measurement subroutine 504b may include instructions for the storing of data collected estimating a non-linear component of a reference signal based on a measurement of a tone at a first harmonic of the plurality of harmonics of the reference signal.

FIG. 6 shows an exemplary flowchart 600 detailing a method for generating a calibration signal for use in calibrating an IQ imbalance according to some aspects.

The method may include: estimating a non-linear component of a reference signal based on a measurement of a tone at a first harmonic of a plurality of harmonics of the reference signal; 602; estimating an in-phase component of the reference signal based on subtracting the non-linear component from a measurement of a tone at a second harmonic of the plurality of harmonics of the reference signal 604; and Generating a calibration signal based on the estimation of the in-phase component 606. The method may also include transmitting the selected reference signal.

In the following, various aspects of the present disclosure will be illustrated:

In Example 1, a communication circuitry for correcting a phase imbalance, the communication circuitry device comprising at least one processor configured to: estimate a non-linear component of a reference signal based on a measurement of a tone at a first harmonic of a plurality of harmonics of the reference signal; estimate an in-phase component of the reference signal based on a difference between the estimated non-linear component and a measurement of a tone at a second harmonic of the plurality of harmonics of the reference signal; and generate a calibration signal based on the estimated in-phase component.

In Example 2, the subject matter of Example(s) 1, further including to transmit the reference signal according to a polar modulation.

In Example 3, the subject matter of Example(s) 2, further including that the reference signal is a carrier wave.

In Example 4, the subject matter of Example(s) 1-3, further including that the reference signal comprises phase non-linearity In Example 5, the subject matter of Example(s) 1-4, further including that the first harmonic of the plurality of harmonics is a harmonic of the reference signal in a positive frequency.

In Example 6, the subject matter of Example(s) 5, further including that the first harmonic of the plurality of harmonics is the third positive harmonic of the reference signal.

In Example 7, the subject matter of Example(s) 1-6, further including that the second harmonic of the plurality of harmonics is a harmonic of the reference signal in a negative frequency.

In Example 8, the subject matter of Example(s) 7, further including that the second harmonic of the plurality of harmonics is the first negative harmonic of the reference signal.

In Example 9, the subject matter of Example(s) 1-8, further including a transmitter, wherein the transmitter is configured to transmit a signal according to a polar modulation.

In Example 10, the subject matter of Example(s) 1-9, further including a receiver, wherein the receiver is configured to receive a signal according to a quadrature amplitude modulation.

In Example 11, the subject matter of Example(s) 1-10, further including that the transmitter and the receiver are connected via a loopback.

In Example 12, the subject matter of Example(s) 1-11, further including that the loopback comprises a phase locked loop.

In Example 13, the subject matter of Example(s) 1-12, further including that the reference signal is transmitted from the transceiver to the receiver via the loopback, wherein the loop back comprises a feedback from the receiver to the transmitter.

In Example 14, the subject matter of Example(s) 1-13, further including that the measurement of a tone is a Discrete Fourier Transform of a tone.

In Example 15, the subject matter of Example(s) 1-14, further including that the calibration signal is configured to calibrate a quadrature amplitude modulation signal.

In Example 16, the subject matter of Example(s) 1-15, further including that the calibration signal is configured to calibrate an IQ imbalance of the quadrature amplitude modulation signal.

In Example 17, A method for correcting a phase imbalance, the method comprising: estimating a non-linear component of a reference signal based on a measurement of a tone at a first harmonic of a plurality of harmonics of the reference signal; estimating an in-phase component of the reference signal based on a difference between the estimated non-linear component and a measurement of a tone at a second harmonic of the plurality of harmonics of the reference signal; and generating a calibration signal based on the estimated in-phase component.

In Example 18, the subject matter of Example(s) 17, further including transmitting the reference signal according to a polar modulation.

In Example 19, the subject matter of Example(s) 18, further including that the reference is a carrier wave.

In Example 20, the subject matter of Example(s) 17-19, further including wherein that the reference signal comprises phase non-linearity In Example 21, the subject matter of Example(s) 17-20, further including that the first harmonic of the plurality of harmonics is a harmonic of the reference signal in a positive frequency.

In Example 22, the subject matter of Example(s) 21, further including that the first harmonic of the plurality of harmonics is the third positive harmonic of the reference signal.

In Example 23, the subject matter of Example(s) 17-22, further including that the second harmonic of the plurality of harmonics is a harmonic of the reference signal in a negative frequency.

In Example 24, the subject matter of Example(s) 23, further including that the second harmonic of the plurality of harmonics is the first negative harmonic of the reference signal.

In Example 25, the subject matter of Example(s) 17-24, further including transmitting a signal according to a polar modulation.

In Example 26, the subject matter of Example(s) 17-25, further including receiving a signal according to a quadrature amplitude modulation.

In Example 27, the subject matter of Example(s) 17-26, further including that the transmitter and the receiver are connected via a loopback.

In Example 28, the subject matter of Example(s) 17-27, further including that the loopback comprises a phase locked loop.

In Example 29, the subject matter of Example(s) 17-28, further including that the reference signal is transmitted from the transceiver to the receiver via the loopback, wherein the loop back comprises a feedback from the receiver to the transmitter.

In Example 30, the subject matter of Example(s) 17-29, further including that the measurement of a tone is a Discrete Fourier Transform of a tone.

In Example 31, the subject matter of Example(s) 17-30, further including that the calibration signal is configured to calibrate a quadrature amplitude modulation signal.

In Example 32, the subject matter of Example(s) 17-31, further including that the calibration signal is configured to calibrate an IQ imbalance of the quadrature amplitude modulation signal.

In Example 33, a system comprising one or more devices according to any of Examples 1-16, the system configured to implement a method according to any of Examples 17-32.

In Example 34, a means for implementing any of Examples 17-32.

In Example 35, one or more non-transitory computer readable media comprising programmable instructions thereon, that when executed by one or more processors of a device, cause the device to perform any one of the methods of Examples 17-32.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A communication circuitry for correcting a phase imbalance, the communication circuitry device comprising at least one processor configured to:
    estimate a non-linear component of a reference signal based on a measurement of a tone at a first harmonic of a plurality of harmonics of the reference signal;
    estimate an in-phase component of the reference signal based on a difference between the estimated non-linear component and a measurement of a tone at a second harmonic of the plurality of harmonics of the reference signal; and
    generate a calibration signal based on the estimated in-phase component.

2. The communication circuitry of claim 1, further configured to transmit the reference signal according to a polar modulation.

3. The communication circuitry of claim 2, wherein the reference signal is a carrier wave.

4. The communication circuitry of claim 1, wherein the reference signal comprises phase non-linearity.

5. The communication circuitry of any of claim 1, wherein the first harmonic of the plurality of harmonics is a harmonic of the reference signal in a positive frequency.

6. The communication circuitry of claim 5, wherein the first harmonic of the plurality of harmonics is the third positive harmonic of the reference signal.

7. The communication circuitry of any of claim 1, wherein the second harmonic of the plurality of harmonics is a harmonic of the reference signal in a negative frequency.

8. The communication circuitry of claim 7, wherein the second harmonic of the plurality of harmonics is the first negative harmonic of the reference signal.

9. The communication circuitry of any of claim 1, further comprising a transmitter, wherein the transmitter is configured to transmit a signal according to a polar modulation.

10. The communication circuitry of any of claim 1, further comprising a receiver, wherein the receiver is configured to receive a signal according to a quadrature amplitude modulation.

11. The communication circuitry of any of claim 1, wherein the transmitter and the receiver are connected via a loopback.

12. The communication circuitry of any of claim 1, wherein the loopback comprises a phase locked loop.

13. The communication circuitry of any of claim 1, wherein the reference signal is transmitted from the transceiver to the receiver via the loopback, wherein the loop back comprises a feedback from the receiver to the transmitter.

14. The communication circuitry of any of claim 1, wherein the measurement of a tone is a Discrete Fourier Transform of a tone.

15. The communication circuitry of any of claim 1, wherein the calibration signal is configured to calibrate a quadrature amplitude modulation signal.

16. The communication circuitry of any of claim 1, wherein the calibration signal is configured to calibrate an IQ imbalance of the quadrature amplitude modulation signal.

17. A method for correcting a phase imbalance, the method comprising:
    estimating a non-linear component of a reference signal based on a measurement of a tone at a first harmonic of a plurality of harmonics of the reference signal;
    estimating an in-phase component of the reference signal based on a difference between the estimated non-linear component and a measurement of a tone at a second harmonic of the plurality of harmonics of the reference signal; and
    generating a calibration signal based on the estimated in-phase component.

18. The method of claim 17, further comprising transmitting the reference signal according to a polar modulation.

19. The method of claim 18, wherein the reference signal is a carrier wave.

20. The method of claim 17, wherein the reference signal comprises phase non-linearity.

* * * * *